United States Patent [19]
Grabs

[11] Patent Number: 5,144,915
[45] Date of Patent: Sep. 8, 1992

[54] SYSTEM FOR CONTROLLING AN OPERATING PARAMETER OF AN INTERNAL COMBUSTION ENGINE OF A VEHICLE

[75] Inventor: Manfred Grabs, Wiernsheim, Fed. Rep. of Germany

[73] Assignee: Robert Bosch GmbH, Stuttgart, Fed. Rep. of Germany

[21] Appl. No.: 730,943

[22] PCT Filed: Nov. 16, 1990

[86] PCT No.: PCT/DE90/00882
§ 371 Date: Aug. 12, 1991
§ 102(e) Date: Aug. 12, 1991

[87] PCT Pub. No.: WO91/09220
PCT Pub. Date: Jun. 27, 1991

[30] Foreign Application Priority Data

Dec. 12, 1989 [DE] Fed. Rep. of Germany ....... 3941000
May 12, 1990 [DE] Fed. Rep. of Germany ....... 4015293

[51] Int. Cl.$^5$ ............................................. F02D 41/00
[52] U.S. Cl. ..................................... 123/683; 123/696
[58] Field of Search ................. 123/350, 333; 180/179; 74/860

[56] References Cited

U.S. PATENT DOCUMENTS

| | | | |
|---|---|---|---|
| 4,441,471 | 4/1984 | Kratt et al. | 123/339 |
| 4,867,261 | 9/1989 | King | 180/179 |
| 4,899,623 | 2/1990 | Wokan et al. | 74/860 |
| 4,947,815 | 8/1990 | Peter | 123/350 |
| 5,036,936 | 8/1991 | Kawano et al. | 123/350 |
| 5,048,482 | 9/1991 | Kraft et al. | 123/333 |

FOREIGN PATENT DOCUMENTS 1603921 12/1981 United Kingdom ................ 123/350

*Primary Examiner*—Raymond A. Nelli
*Attorney, Agent, or Firm*—Walter Ottesen

[57] ABSTRACT

A control system controls an operating parameter of an internal combustion engine. The control system includes an electrically operated actuator for acting on the operating parameter to be controlled and a control unit for adjusting the actuator so as to cause the operating parameter to assume a pregiven value. The control unit has an integral component for carrying out an integration and a proportional component for carrying out a proportional amplification operation. The rate of change of the operating parameter is controlled to a pregiven value when pregiven conditions are present by intervening in the integral operation and/or the proportional amplification operation carried out by the control unit.

16 Claims, 3 Drawing Sheets a
SYSTEM FOR CONTROLLING AN OPERATING PARAMETER OF AN INTERNAL COMBUSTION ENGINE OF A VEHICLE

FIELD OF THE INVENTION

The invention relates to a system for controlling an operating parameter of an internal combustion engine.

BACKGROUND OF THE INVENTION

Such a system for controlling an operating parameter of an internal combustion engine is well known for the idling speed control of engines from U.S. Pat. No. 4,441,471. There, it is suggested that for the control of the idling speed, an electrically operated actuator, which has an effect on this operating parameter, is triggered via a PID-controller in such a way that the idling speed, as the operating parameter to be controlled, takes on a predetermined desired value. Furthermore, a limiting controller is provided for the speed and temperature dependent limitation of the actuator trigger signal, this limiting controller affecting the PID-controller in the sense of a maximum or minimum limitation of the trigger signal.

Systems which are difficult to control cannot be satisfactorily controlled by a PID-controller with respect to accuracy of control, dynamics and/or stability. These systems are found for example in the use of actuators which have highly variable frictional forces over the controlling range and also have torques which oppose the control movement with specimen dispersions and temperature drifts additionally playing a role.

It is thus the task of the invention to specify measures which ensure satisfactory control of an operating parameter in an internal combustion engine, even in the case of systems which are difficult to control. This is achieved in that, with predetermined conditions being present, the rate of change of the operating parameter to be controlled can be adjusted to a predetermined value by means of intervention in the integration process and/or in the proportional amplification process.

From U.S. Pat. No. 4,947,815, an actuator for the controlled supply of combustion air to an internal combustion engine is known, which actuator is equipped with a return spring against which a counterspring acts in order to set a predetermined rest position. This actuator counteracts an adjusting movement in the different areas of its adjustment travel by means of various forces or torques.

British Pat. 1,603,921 describes a control system for the position control of a throttle flap of an internal combustion engine in dependence upon the accelerator pedal position, a so-called electronic accelerator. In order to improve the exhaust-gas composition, the level of the output signal of the position controller is limited. With a fast change in the accelerator pedal position, this leads to a limit on the rate of change of the throttle flap and also leads to an improvement of the composition of the exhaust gas in the transition range.

SUMMARY OF THE INVENTION

The measures according to the invention ensure satisfactory control of systems which are difficult to control. Controlling the rate of change of the operating parameter to be controlled to a pregiven value, under predetermined conditions, by means of intervention in the integration and/or proportional amplification operation executed by the control unit, enables the selection of the integration and/or proportional component of the controller with a view to achieving sufficient dynamics of the control system. The measures mentioned above thus allow, for example, a very large integration component. The instability which normally occurs in control systems with a strong integration component is suppressed by means of intervention in the integration and/or proportional amplification operation, in the sense of reducing the rate of change of the actual value when a predetermined threshold is reached by the rate of change of the operating parameter to be controlled.

A particularly advantageous implementation of the intervention in the integration operation is the superposition of the integral component of the controller by a two-position controller which is formed by the reversal of the direction of integration on reaching or exceeding or falling below the threshold value. Control of the rate of change of the operating parameter to be controlled is thus achieved.

Intervention in the proportional amplification operation of the controller is performed advantageously in an analogous manner to the intervention in the integration operation, by reversing the operating sign of the amplification factor of the P-component of the controller, this operation being equivalent to a superposition of the P-component by a two-position controller.

Further advantages of the invention result in connection with the dependent claims and from the following description of an embodiment.

BRIEF DESCRIPTION OF THE DRAWINGS

The invention is explained below with reference to the embodiments illustrated in the drawing.

DESCRIPTION OF THE PREFERRED EMBODIMENTS OF THE INVENTION

Figure 1:
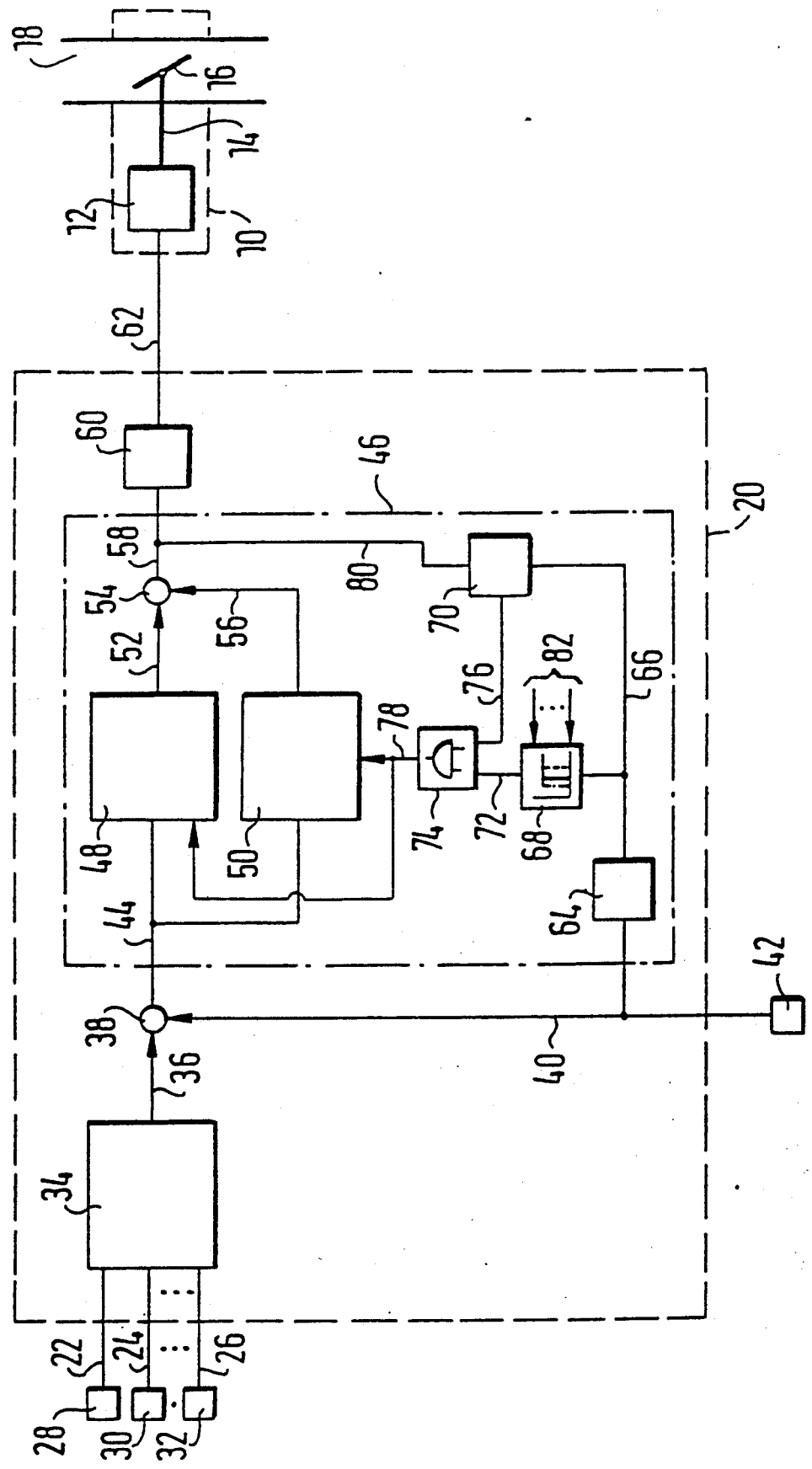
FIG. 1 shows a block diagram of a control system for controlling the position of a power actuator of an internal combustion engine with the aid of which the function of the procedure according to the invention is clarified.

FIG. 1 shows an actuator unit 10 for setting an operating parameter of an internal combustion engine (not shown). This actuator unit 10 comprises a positioning motor 12 which is connected, via a rigid connection 14, to an actuator 16 for the purpose of influencing the operating parameter of the internal combustion engine. This actuator 16 is represented in the embodiment of FIG. 1 as the throttle flap in the intake system 18 of an internal combustion engine. The concept of the invention is not, however, restricted to this type of actuator; this can also be, for example, the control rod of a diesel combustion engine.

Furthermore, FIG. 1 shows an engine control system 20 which can perform various functions such as, for example, fuel metering, ignition time-point determination, exhaust gas control, idling speed control, and/or electronic accelerator pedal. In the embodiment of FIG. 1, only the part required for the position control of the actuator unit 10 and the part for the implementation of the method according to the invention is described. The input lines 22 and 24 to 26 connect the engine control system 20 with measuring arrangements 28 and 30 to 32, which supply the desired-value formation unit 34 with the generally known operating parameters of the internal combustion engine and of the vehicle in order to form the control desired value. Such operating parameters can be, for example, engine temperature, rotational speed, gear and/or clutch position, battery voltage, accelerator pedal position, etc. The output line 36 of the desired value formation unit 34 is linked, at a comparator point 38, with a further input line 40 of the engine control system 20. The input line 40 is connected to an actual value measuring arrangement 42, which measures the current position of the actuator unit 10 in accordance with the embodiment.

The output line 44 of the comparator point 38 forms an input line of a control unit 46 (outlined by a dot-dash line), which comprises essentially a proportional controller component 48, which is connected to the input line 44, and an integral controller component 50 which is likewise connected to the input line 44. A line 52 connects the proportional controller component 48 with a summation point 54, which is further connected via a line 56 to the integral controller component 50. The addition result of the summation point 54 is transmitted via a line 58 which links the summation point 54 with a drive stage 60, and via a connection line 62 which connects the drive stage 60 and thus the engine control system 20 with the actuator unit 10 or the positioning motor 12, for the purpose of controlling the position of the actuator 16 or the actuator unit 10.

The control unit 46 further comprises a differentiating element 64, which is connected on the one hand with the input line 40 of the engine control system 20, and is linked on the other hand via a line 66 with a threshold stage 68 and with a unit 70. The unit 70 is also connected via a line 80 to the line 58. The threshold stage 68 has further inputs 82 which supply measured values (described in more detail below) for influencing the threshold value, these measured values coming from corresponding measuring arrangements which are not shown in FIG. 1. The output line 72 of the threshold stage 68 forms an input of a logic AND element 74, the second input of which forms the connection line 76 which connects the logic AND element 74 with the unit 70. The output line 78 of the logic AND element 74 is connected to the integral controller component 50 for determining the integration operation, and/or to the proportional controller component 48 for determining the proportional amplification operation.

In dependence on the operating parameters supplied via the lines 22 and 24 to 26, the desired value formation unit 34 forms a desired value for the position of the actuator unit 10. If the arrangement according to FIG. 1 serves to control the idling speed via the position of the actuator unit 10, then the desired value formation unit 34 determines the desired value as a function of the operating parameters rotational speed, engine temperature, battery voltage, gear position and/or clutch position, etc.; in the case of an electronic accelerator pedal, which controls the output of the internal combustion engine via the position of the actuator unit 10, the desired value formation unit 34 determines the positioning desired value in particular from the position of the accelerator pedal. The desired value is transmitted via the line 36 to the comparator point 38 where from the calculated desired value and from the positional actual value of actuator unit 10, which is measured by the actual value measuring arrangement 42 and supplied via the line 40 to the comparator point 38, a signal representing the deviation between the two values is transmitted via the line 44 to the control unit 46. Depending on this deviation signal, the proportional control component 48 and the integral control component 50 form corresponding output signals which are brought together in the summation point 54 to a control unit output signal which, via the drive stage 60 and the output line 62 of the engine control system 20, effects a change in the position of the actuator unit in the sense of reducing the deviation.

The control of the rate of change, suggested in accordance with the invention, of the operating parameter to be controlled, which in the case of the embodiment of FIG. 1, is the position of the actuator unit 10, is effected by the differentiating element 64 determining the rate of change of the positional or actual value signal in the input line 40. This value is transmitted on the one hand via the line 66 to the threshold stage 68, and on the other hand to the unit 70. The threshold stage 68 sets a threshold value in dependence on the parameters on its input lines 82, such as engine temperature, actuator unit temperature and/or deviation. The unit 70 is also connected to the controller output signal on line 58 or 62 and determines the operational signs of the change of the controller output signal and the rate of change signal of the actual value. If both operational signs are the same, then the unit 70 transmits a corresponding signal on line 76 to the AND element 74. If the differentiated actual value signal exceeds or reaches the threshold value pregiven by threshold stage 68, then a corresponding signal is transmitted to the AND element 74 via the line 72. If both the differentiated actual value signal has reached or exceeded the threshold value of the threshold stage 68, and the operational signs of the differentiated actual value signal and the controller output signal are the same, then the output line of the AND element 74 carries a signal which intervenes in the integration process of the integral controller component 50, in particular to change the direction of integration of the integral controller component 50, or which intervenes in the proportional amplification process of the proportional controller component 48, in particular to change the operational sign of the proportional amplification factor.

A large deviation between desired value and actual value, for example arising through a change of the desired value (in the case of idling speed adjustment for example by switching in an additional load) leads to a correspondingly rapid change in the controller output signal, which causes a similar change in the actual value signal if there is a strong integral component in the controller. If the rate of change of the actual value signal exceeds the pregiven threshold value, so that control oscillations and instabilities can occur, then the direction of integration of the integral controller component 50 is reversed, for example by means of reversing the operational sign of its input signal. This reversal is caused by the threshold value being exceeded, this threshold value being pregiven by the threshold stage 68. An output signal of the integral controller component 50 is then obtained which operates counter to the change and this leads to a reduction in the rate of change in the actual value signal. If the value falls below the threshold value pregiven by the threshold stage 68, then the direction of integration of the integral controller component 50 changes once more, back to its original direction, which results in an increase in the rate of change, providing there is still a deviation between the desired value and the actual value. In this way, by reversing the direction of integration of the integral controller component 50, a two-position controller superposed on this integral component is implemented which controls the rate of change of the actual value to a predetermined value. This predetermined value is determined by the threshold stage 68. With the aid of this measure, the dynamics required for control and the necessary stability for the above-mentioned systems, which are difficult to control, are achieved.

The effect of the intervention in the proportional amplification process is obtained in a way similar to the above description of the intervention in the integration process.

The additional, not absolutely necessary condition that the change or the operational signs of the actual value signal and of the controller output signal must be the same, serves to improve the behavior in the transition range. If the controller output signal and the actual value signal show a falling tendency, then if there is a change in the deviation signal between desired value and actual value (due to an increase in the desired value), which leads to an increase in the controller output signal, response of the arrangement in this transition case is prevented.

The concept of the invention is not restricted to a positioning control of an actuator but can be applied to all control systems of the internal combustion engine (in particular of speed controls) which have the previously described disadvantages of a system which is difficult to control. The allocation of the individual components to the different assemblies of engine control system and controller unit is simply for clarity. Furthermore, in the case of the controller, it could also be a PID-controller or a controller with proportional, integral and/or differential components.

Apart from the reversal of the direction of integration described above, the rate of change can also be controlled by means of interventions in the integration process such as stopping the integration when the threshold is exceeded, changing the integration gradient or reversing the direction of integration or changing the gradient after a given delay time. Reversing the direction of integration has shown itself in a concrete case to be the most suitable.

Figure 2:
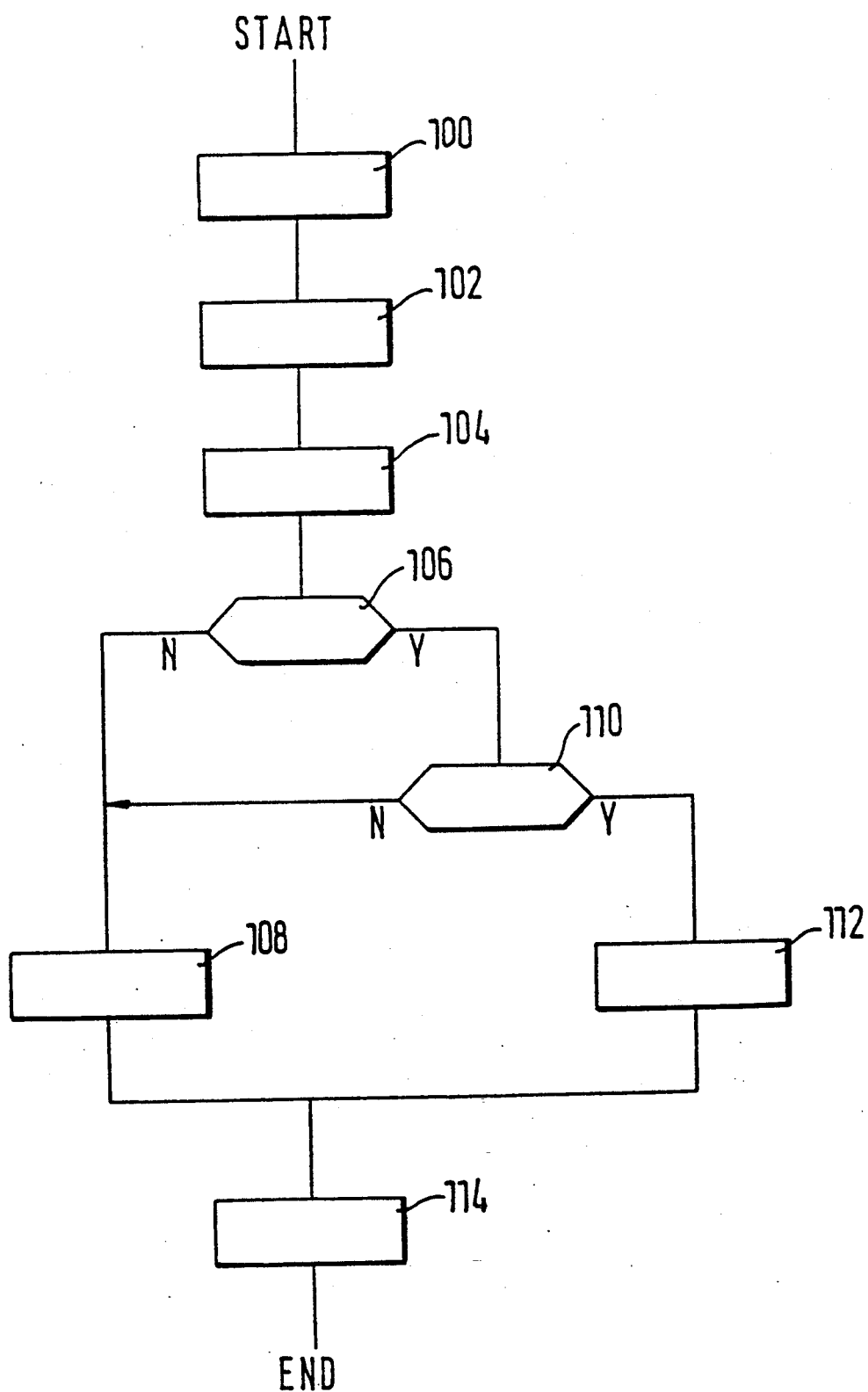
FIG. 2 shows, on the basis of a flowchart, the implementation of this procedure in a digital configuration. Finally

A digital design form of the concept of the invention is presented in FIG. 2. After starting the program part, the deviation between the desired value and the actual value is determined by comparing the desired value and the actual value in step 100. Also in step 100, the rate of change of the actual value signal is calculated, for example by differentiation. In step 102, the output signal of the proportional controller component is calculated in dependence on the deviation between the desired value and the actual value.

The calculation of the output signal of the proportional controller component 48 preferably takes place as a function of the deviation. Here, the amplification factor of the proportional controller component is determined in such a way that the deviation control is highly dynamic, avoiding overshooting in the overall value range of the deviation. To this end, a value for the maximum deviation specific to the system is pregiven and the difference between this maximum value and the actual value of the deviation is formed. This difference is proportional to the amplification factor of the proportional component of the controller.

If the amplification factor which has been formed in this way falls below a pregiven value, then the amplification factor is set to this pregiven value, otherwise it represents a function of the deviation. The output signal of the proportional component is then determined from deviation and amplification factor.

The dependence of the proportion component on the deviation in specified operating ranges can be shown by the following equations:

$$P = P_0 * (MAX - DELTA) * K \quad \text{if } P > P_0$$
$$P = P_0 \quad \text{if } P < P_0$$

(P is the proportional amplification factor, $P_0$ is the pregiven fixed value of the proportional amplification factor, MAX is the maximum value of the deviation specific to the system, DELTA is the deviation with a value range of 0 - MAX, K is the constant).

From this follows a characteristic dependence of the P-amplification factor on the deviation, which can be essentially shown in a P-DELTA-diagram by a straight line of negative gradient for $P > P_0$ and by a horizontal straight line $P = P_0$ if $P < P_0$.

The resulting output signal of the proportional component of the controller, which is formed by multiplying the proportional factor calculated according to the above equation by the value of the control deviation, shows the behavior outlined below dependent on the control deviation. Starting from the value 0, which is taken in the case of a 0 control deviation, a dependence of the output signal on the control deviation is obtained which, rising with the deviation and —depending on the choice of K and $P_0$—falling after exceeding a maximum value, approaches a fixed value for the maximum deviation, this fixed value being dependent on the choice of the value $P_0$.

Thus, with respect to the dynamics and stability of the closed-loop circuit, improved control is achieved since in the case of slight deviation the amplification is less than in the case of greater deviation. Furthermore, the amplification factor can be adapted to the particular closed-loop circuit by means of the choice of parameters.

Step 104 determines, on the basis of a digital integral controller equation which is known to the expert, the increase value $I_n$, which is to be added to the initial value of the controller in the current program run in dependence on the deviation between the desired value and the actual value. If the deviation between the desired value and the actual value is negative, then the value calculated in 104 is likewise negative. In inquiry step 106, a check is made as to whether the rate of change of the actual value has reached or exceeded the pregiven value. If this is not the case, then in step 108, the proportional output signal which was determined in step 102, is read out and the integral output signal of the controller, as a sum of the integrator initial value of the preceding program run and the increase value determined in this program run, is determined and is likewise read out; in step 114 the sum value is set for the next program run in accordance with the integrator initial value determined in step 108, and the program part is performed again.

If it is ascertained in step 106 that the rate of change of the actual value has exceeded or reached the pregiven threshold value, then the operational signs or the direction of change of the actual value signal and the controller output signal are checked in inquiry step 110 to see if they are the same. If both operational signs are not the same, then it continues with step 108; in step 114, the integrator initial value determined in step 108 is set as sum value for the next program run and the program part is ended.

If, however, it is ascertained that the operational signs of the controller output signal and the actual value signal are the same, then in step 112, the proportional output signal determined in step 102 is calculated and read out, for example by reversing the operation sign of the amplification factor, while the output signal of the integral control unit component is determined from the subtraction of the sum value of the preceding program runs and of the increase value calculated in step 104 of this program run. The subtraction of the increase value from the sum value leads to a change in the direction of integration of the digital controller. In step 114, the integrator initial value as sum value is set as determined in step 112 for the next program run.

Figure 3:
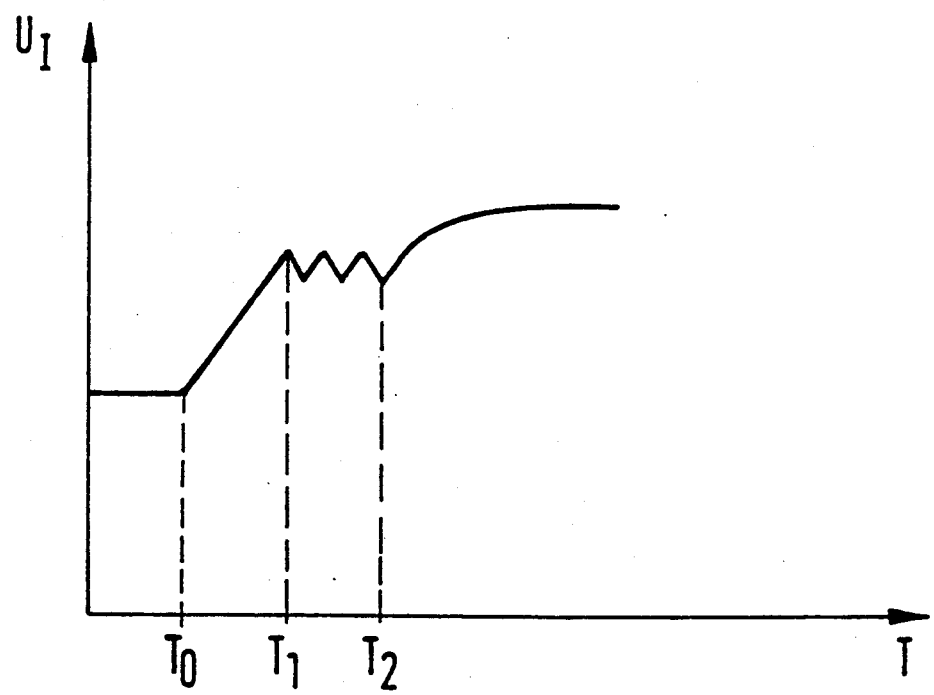
FIG. 3 shows an example of the time dependent trace of the output signal of the integral component.

In FIG. 3, as an example, the time-dependent trace of the integral output signal over time is described. At time $T_0$, the control process starts to run. If there is no deviation between desired value and the actual value, then the integral output signal starts based on a constant value. If a desired value/actual value deviation occurs, the integrator output signal increases in dependence on the deviation of a pregiven function, which is represented in a linear manner in FIG. 3 for the sake of clarity. At time point $T_1$, it is detected that the rate of change threshold of the actual value has been exceeded, and in accordance with FIG. 2, the direction of integration is reversed by subtraction of the increase values so that the integrator initial value decreases according to a pregiven function. If the value falls below the pregiven threshold of the rate of change of the actual value, then this leads to renewed reversal of the direction of integration so that the integrator output increases again. In an advantageous implementation, of the concept of the invention, the threshold value can be formed as a hysteresis. This zigzag course of the type of a two-position controller (in a further design with hysteresis), controls the rate of change of the actual value to a pregiven value.

At time point $T_2$, assume the control conditions to be such that the pregiven threshold value of the rate of change is no longer reached. This would be the case, for example, if the control deviation between desired value and actual value has taken on a low value or the value zero, or if the polarity of the control deviation has reversed, for example due to an additional load having been switched off. In FIG. 3, the first case is shown. The integrator output signal increases in accordance with the normal control function of a pregiven function (ideally an exponential function) and approaches the stationary value at control deviation zero. In digital systems, the signal has a step-like trace.

A further embodiment of the concept of the invention results from a superpositioning of the integral component and/or the proportional component of the controller by a two-position controller. This controller, which can be equipped with or without hysteresis, is activated when the threshold is reached or exceeded, the integration process then being stopped. If the value falls below a lower threshold value of the rate of change, the function of the integral component is taken up again and the two-position controller is switched off.

The procedure according to the invention can also be advantageously applied not only in the case of positive control deviations and rising control function, but also in the case of negative control deviation and falling control function.

If the direction of integration is reversed, it is possible in a favorable implementation of the concept of this invention, to use different integration time constants for each direction. If the reversal of the direction of integration takes place in the sense of a reduction of the rate of change of the actual value, then it can be advantageous to carry out the integration in this direction for a faster reaction of the system with a larger integration constant then in the other direction.

An analogous influence on a possibly existing D-component may also be provided.

I claim:

1. A control system for controlling an operating parameter of an internal combustion engine, the control system comprising:
    an electrically operated actuator for acting on the operating parameter to be controlled;
    a control unit for adjusting said actuator so as to cause said operating parameter to assume a pregiven value;
    said control unit including at least one of an integral component for carrying out an integration and a proportional component for carrying out a proportional amplification operation; and,
    intervention means for controlling the rate of change of said parameter to a pregiven value when pregiven conditions are present by intervening in at least one of the integral operation and the proportional amplification operation carried out by said control unit.

2. A control system for controlling an operating parameter of an internal combustion engine having an air intake for conducting air to the engine, the control system comprising:
    an electrically operable actuator for adjusting the air intake of the engine to operate on said operating parameter;
    a control unit for adjusting said actuator so as to cause said operating parameter to assume a pregiven value;
    said control unit having an integral component for enabling said control unit to carry out an integration operation; and
    intervention means for controlling the rate of change of said parameter to a pregiven value in response to pregiven conditions by intervening in said integration operation.

3. The control system of claim 2, said control unit including at least one of said integral component and a proportional component for carrying out at least one of said integration operation and a proportional amplification operation.

4. The control system of claim 3, wherein the rate of change of said parameter can, when a pregiven threshold value has been reached or exceeded, be adjusted to the pregiven threshold value by intervening in at least one of the integration operation and the proportional amplification operation performed by the control unit.

5. The control system of claim 3, wherein the intervention in at least one of the integration operation and the proportional amplification operation occurs when the threshold value has been reached or exceeded, in the manner of a reduction in the rate of change of the actual value, or when the value falls below the threshold value, in the manner of an increase in the rate of change of the actual value.

6. The control system of claim 3, wherein the control of the rate of change of said parameter takes place when, additionally, the change of said parameter and the change of the actuator drive signal are in the same direction.

7. The control system of claim 3, wherein the pregiven threshold value is changeable in dependence upon at least one of engine temperature, actuator temperature and control deviation.

8. The control system of claim 3, wherein, with predetermined conditions existing, the control of the rate of change of said parameter takes place by influencing at least one of the integral and proportional component in the manner of a two-position controller.

9. The control system of claim 3, wherein a two-position controller with or without hysteresis is superposed on at least one of the integral component and proportional component for activating said two-position controller when certain conditions exist and while stopping the integration operation.

10. The control system of claim 3, wherein, when the pregiven threshold value is reached, the direction of integration of the integral component of the control unit is reversed and when the value falls below the threshold value, the direction is reversed again.

11. The control system of claim 3, wherein the pregiven threshold value is formed with a hysteresis.

12. The control system of claim 3, wherein the intervention is brought about by doing at least one of the following: stopping the integration operation, by changing the integration gradient, by delaying the reversal of the direction of integration and changing the gradient.

13. The control system of claim 3, wherein the intervention in the proportional amplification operation of the control unit is effected by reversing the operational sign of the amplification factor.

14. The control system of claim 3, wherein the P-amplification factor is selected in a pregiven manner in dependence on the control deviation.

15. The control system of claim 2, wherein said intervention means is adapted to intervene in said integration operation when a pregiven value of said rate of change of said parameter is exceeded to effect a reduction of said rate of change.

16. The control system of claim 1, wherein said intervention means is adapted to intervene in said at least one of said integral operation and said proportional operation when a pregiven value of said rate of change of said parameter is exceeded to effect a reduction of said rate of change.

* * * * *